United States Patent
Guess, Jr.

(12)

(10) Patent No.: US 9,963,329 B1
(45) Date of Patent: May 8, 2018

(54) UTILITY TASK VEHICLE (UTV) ACCESSORY FOR A SIDE-BY-SIDE UTV HAVING A FRONT-MOUNTED WINCH

(71) Applicant: Lawrence E. Guess, Jr., Palestine, TX (US)

(72) Inventor: Lawrence E. Guess, Jr., Palestine, TX (US)

(*) Notice: Subject to any disclaimer, the term of this patent is extended or adjusted under 35 U.S.C. 154(b) by 0 days. days.

(21) Appl. No.: 15/423,519

(22) Filed: Feb. 2, 2017

(51) Int. Cl.
| | | |
|---|---|---|
| B66D 3/06 | (2006.01) | |
| B66D 3/26 | (2006.01) | |
| B60P 1/04 | (2006.01) | |
| B66D 3/20 | (2006.01) | |

(52) U.S. Cl.
CPC .................. B66D 3/26 (2013.01); B60P 1/04 (2013.01); B66D 3/06 (2013.01); B66D 3/20 (2013.01); *B66D 2700/0191* (2013.01)

(58) Field of Classification Search
CPC ...................................... B66D 3/06; B66D 3/08
See application file for complete search history.

(56) References Cited

U.S. PATENT DOCUMENTS

| | | | |
|---|---|---|---|
| 2,755,943 A | | 7/1956 | Payne |
| 2,812,071 A | * | 11/1957 | Lanigan .................. B66C 23/36 212/296 |
| 3,304,097 A | | 2/1967 | Lewis |
| 3,390,795 A | * | 7/1968 | Mannix ................. B60P 1/5423 414/461 |
| 3,526,289 A | | 9/1970 | Rodgers |
| 3,554,397 A | | 1/1971 | Cluff |
| 3,606,249 A | | 9/1971 | Pewthers |
| 3,724,695 A | | 4/1973 | Taylor |
| 3,826,334 A | | 7/1974 | Spillman |
| 4,058,229 A | | 11/1977 | Triplett |
| 4,398,581 A | | 8/1983 | Aikins |
| 4,530,232 A | | 7/1985 | Smith |
| 4,795,135 A | | 1/1989 | Scott |
| 4,953,757 A | | 9/1990 | Stevens |
| 4,979,865 A | | 12/1990 | Strickland |
| 5,054,745 A | | 10/1991 | Swayze |
| 5,314,289 A | | 5/1994 | O'Leary |
| 5,393,194 A | * | 2/1995 | Smith ....................... B60P 1/00 212/298 |
| 5,662,451 A | | 9/1997 | Muzzi |
| 5,752,799 A | * | 5/1998 | Carey ................... B60P 1/5471 224/403 |
| 5,839,876 A | | 11/1998 | McCarthy |

(Continued)

*Primary Examiner* — Emmanuel M Marcelo
(74) *Attorney, Agent, or Firm* — Thomas D. Fortenberry (57) ABSTRACT

The present invention discloses a utility task vehicle ("UTV") accessory for a side-by-side UTV having a front-mounted winch. The UTV accessory includes a support frame capable of mounting to a front region of the UTV. The UTV accessory includes a first pulley mounted to a bottom region of the support frame substantially level with the winch mounted on the UTV. The first pulley is capable of receiving a winch line from the winch and redirecting the winch line. The UTV accessory includes a second pulley mounted toward a top region of the support frame. The second pulley is capable of receiving the winch line from the first pulley and redirecting the winch line so that the direction of a winch force provided by the winch is relocated to a higher region than the location of the winch on the UTV.

11 Claims, 8 Drawing Sheets

(56) References Cited

U.S. PATENT DOCUMENTS

| | | | |
|---|---|---|---|
| 5,876,019 A | 3/1999 | Morrissey | |
| 5,906,470 A | 5/1999 | Desjardins | |
| 5,984,614 A | 11/1999 | Weber | |
| 6,109,855 A | 8/2000 | Vela-Cuellar | |
| 6,155,771 A | 12/2000 | Montz | |
| 6,231,030 B1 | 5/2001 | Smith | |
| 6,286,619 B1 | 9/2001 | Uchiyama | |
| 6,343,669 B2 | 2/2002 | Davis | |
| 6,425,596 B1 | 7/2002 | Foers | |
| 6,446,748 B1 | 9/2002 | Suzuki | |
| 6,461,095 B1 * | 10/2002 | Puska | B66F 9/06 224/401 |
| 6,502,334 B1 | 1/2003 | Davies | |
| 6,589,004 B2 | 7/2003 | Reed | |
| 6,612,549 B1 | 9/2003 | Woods | |
| 6,705,821 B2 | 3/2004 | Philipps | |
| 6,749,267 B1 * | 6/2004 | Brooks | B60P 1/14 298/19 V |
| 6,817,825 B1 | 11/2004 | O'Hagen | |
| 6,964,121 B2 | 11/2005 | Harris | |
| 7,059,955 B2 | 6/2006 | Green | |
| 7,237,817 B2 | 7/2007 | Kobylski | |
| 7,293,680 B1 | 11/2007 | Wawerski | |
| 7,544,032 B1 | 6/2009 | Scott | |
| 7,575,120 B2 | 8/2009 | Beatty | |
| 7,594,641 B2 | 9/2009 | Sharp | |
| 7,600,480 B2 | 10/2009 | Olson | |
| 7,611,320 B2 | 11/2009 | Bell | |
| 7,618,024 B2 | 11/2009 | Constant | |
| 7,845,622 B1 | 12/2010 | Riggs | |
| 7,849,614 B2 | 12/2010 | Belzile | |
| 7,878,484 B2 | 2/2011 | Kitchens | |
| 7,896,604 B1 * | 3/2011 | Donlin | B66D 1/00 212/180 |
| 8,122,998 B2 | 2/2012 | Liles | |
| 8,322,964 B2 | 12/2012 | O'Brien | |
| 8,602,394 B2 * | 12/2013 | Christiansen | B66D 3/006 254/323 |
| 8,689,898 B2 * | 4/2014 | Benesch | B66F 9/065 172/272 |
| 8,851,823 B1 | 10/2014 | Hallmon | |
| 9,004,842 B2 | 4/2015 | Downing | |
| 9,073,475 B2 | 7/2015 | Chastain | |
| 9,127,509 B2 * | 9/2015 | Robinson | E21B 7/027 |
| 9,783,398 B1 * | 10/2017 | Dartlon | B60P 1/04 |
| 2001/0014272 A1 | 8/2001 | Ochoa | |
| 2002/0168258 A1 * | 11/2002 | Philipps | B60P 1/4407 414/462 |
| 2006/0033377 A1 | 2/2006 | Frimel | |
| 2006/0045704 A1 * | 3/2006 | Laufenberg | B60P 1/548 414/543 |
| 2006/0104767 A1 | 3/2006 | Dugger | |
| 2006/0280584 A1 * | 12/2006 | Spuzak | B66C 23/44 414/462 |
| 2007/0166138 A1 | 7/2007 | Brooks | |
| 2008/0264990 A1 * | 10/2008 | Riegert | B60R 9/06 224/519 |
| 2008/0302601 A1 * | 12/2008 | Baker | B66B 9/16 182/69.4 |
| 2010/0111658 A1 | 5/2010 | Galliano | |
| 2012/0319064 A1 * | 12/2012 | Selkowitz | B66C 1/36 254/323 |
| 2014/0144861 A1 * | 5/2014 | Davis | B66C 23/44 212/230 |
| 2014/0161575 A1 | 6/2014 | Parker | |
| 2015/0225212 A1 | 8/2015 | Avila | |
| 2016/0167933 A1 * | 6/2016 | Birch | B66C 23/44 254/326 |
| 2016/0311666 A1 * | 10/2016 | Anderson | B66D 1/36 |

* cited by examiner

UTILITY TASK VEHICLE (UTV) ACCESSORY FOR A SIDE-BY-SIDE UTV HAVING A FRONT-MOUNTED WINCH

TECHNICAL FIELD

The present invention relates to the field of a utility task vehicle ("UTV") accessory for a side-by-side UTV having a front-mounted winch.

BACKGROUND ART

Not applicable.

SUMMARY OF INVENTION

The present invention discloses a utility task vehicle ("UTV") accessory for a side-by-side UTV having a front-mounted winch. The UTV accessory according to embodiments of the present invention includes a support frame capable of mounting to a front region of the UTV. The support frame may be L-shaped in some embodiments. In some embodiments, the UTV accessory may include one or more auxiliary support bars, each of the one or more auxiliary support bars mounted to the support frame and mounted to the front of the UTV to provide additional structural support for the support frame.

The UTV accessory according to embodiments of the present invention includes a first pulley mounted to a bottom region of the support frame substantially level with the winch mounted on the UTV, the first pulley capable of receiving a winch line from the winch and redirecting the winch line. The UTV accessory includes a second pulley mounted toward a top region of the support frame, the second pulley capable of receiving the winch line from the first pulley and redirecting the winch line so that the direction of a winch force provided by the winch is relocated to a higher region than the location of the winch on the UTV. The first pulley and the second pulley may be mounted to front side of the support frame according to embodiments of the present invention. Also, in some embodiments, the second pulley may include a fixed plate, a moveable plate, and a wheel mounted between the fixed plate and the moveable plate, wherein the moveable plate is secured by a plate fastener.

In some embodiments, the UTV may include a dump bed, and the UTV accessory may include a third pulley mounted to a front edge of the dump bed. In such embodiments, the third pulley may be capable of receiving the winch line from the second pulley and redirecting the winch line so that the direction of the winch line force provided by the winch is relocated to a rear region aft of the winch.

In some embodiments, the support frame may include a horizontal support bar, a vertical support bar, and support plates, the support plates connecting the horizontal support bar with the vertical support bar at a right angle and forming a gap between the horizontal support bar and the vertical support bar through which the winch line is capable of passing.

Still further, in certain embodiments, a UTV may include a cabin and a dump bed, and the UTV accessory may include an upper cabin pulley mounted on top of the cabin of the UTV, the upper cabin pulley capable of receiving the winch line from the second pulley and redirecting the winch line so that the direction of the winch line force provided by the winch is relocated to a top-rear region aft of the winch and on top of the cabin. In still other embodiments, the UTV accessory may include a lower cabin pulley mounted underside a top of the cabin of the UTV, the lower cabin pulley capable of receiving the winch line from the second pulley and redirecting the winch line so that the direction of the winch line force provided by the winch is relocated to a top-rear region aft of the winch and adjacent to and below a ceiling of the cabin.

In some embodiments, the UTV accessory may include a hook catch mounted to the support frame, the hook catch capable of securing the winch hook to hold the winch hook in place when not being used.

Some UTV's may include an accessory receiver mounted below the winch. In those embodiments, the support frame may be configured to fit inside and be secured to the accessory receiver.

BRIEF DESCRIPTION OF DRAWINGS

The accompanying drawings, which are incorporated in and constitute a part of this specification, illustrate an implementation of apparatus consistent with the present invention and, together with the detailed description, serve to explain advantages and principles consistent with the invention. In the drawings, FIG. 1 sets forth a line drawing illustrating a perspective view of an exemplary UTV accessory installed on a side-by-side UTV having a front-mounted winch according to embodiments of the present invention.

DESCRIPTION OF EMBODIMENTS

Figure 1:
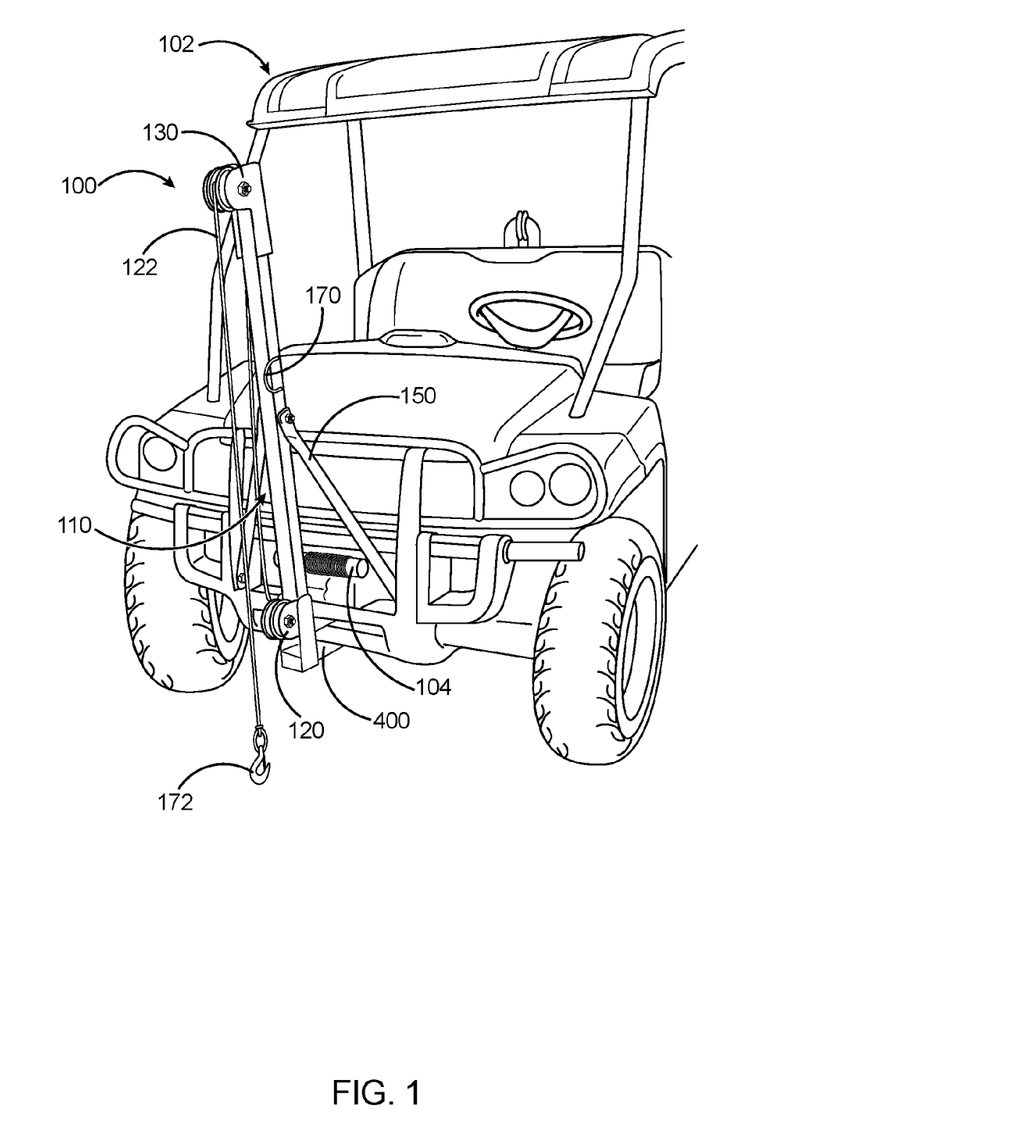

Exemplary embodiments of an UTV accessory for a side-by-side UTV having a front-mounted winch are described herein with reference to the accompanying drawings, beginning with FIG. 1. FIG. 1 sets forth a line drawing illustrating a perspective view of an exemplary UTV (100)

accessory installed on a side-by-side UTV (102) having a front-mounted winch (104) according to embodiments of the present invention according to embodiments of the present invention.

The exemplary utility task vehicle (102) of FIG. 1 is a vehicle with four or more wheels having a side-by-side, non-straddle seating arrangement. Such exemplary UTVs typically seat two to six people and have a steering wheel for directional controls, foot-pedals for throttle and braking, and a rear hauling bed. Exemplary UTVs may also include occupant restraints and roll over protection. UTVs may be referred to using various other names including side-by-side ("SxS"), Recreational Off-Highway Vehicle ("ROV"), and Multipurpose Off-Highway Utility Vehicle ("MOHUV"). Commercially available UTVs useful with embodiments of the present invention include but are not limited to the John Deere Gator™, Polaris Ranger®, Honda Big Red, and may others. For comparison, UTVs generally have a higher payload capability and are longer and wider than all-terrain vehicles ("ATVs") and may carry large payloads above the operator and/or passenger's weight.

In FIG. 1, the exemplary front-mounted winch (104) is a mechanical device that is used to pull in (wind up) or let out (wind out) or otherwise adjust the tension and/or length of winch line (122). The exemplary winch line (122) of FIG. 1 may be a rope, cord, wire, cable, string, strap, or any other line as may occur to those of skill in the art. Turning back to the winch (104), in the simplest form, the winch (104) of FIG. 1 consists of a spool (or winch drum) and attached motorized crank. The motorized crank may be powered by electric, hydraulic, pneumatic, internal combustion drives, or any other mechanism as will occur to those of skill in the art. In other forms, winches may be non-motorized and powered manually using hand cranks. Some winches useful in the embodiment of FIG. 1 may also include a solenoid brake or a mechanical brake or ratchet and pawl device that prevents it from unwinding unless the pawl is retracted.

The exemplary UTV accessory (100) of FIG. 1 includes a support frame (110) capable of mounting to a front region of the UTV (102). The exemplary support frame (110) of FIG. 1 is L-shaped and formed from square metal tubing. Those skilled in the art will recognize, however, that a support frame useful in embodiments of the present invention may take other shapes such as, for example, a J-shape or curved frame and may be formed from other materials such as circular tubing, fiberglass, wood, certain harden plastics or rubbers or any other materials as will occur to those of skill of the art.

The support frame (110) of FIG. 1 mounts to the front region of the UTV (102) using an accessory receiver (400). The accessory receiver (400) of FIG. 1 is implemented as a standard hitch receiver. For UTVs not having an accessory receiver already built into the UTV, a piece of square tubing welded to the winch plate would also provide an adequate accessory receiver to which the exemplary support frame (110) of FIG. 1 could be mounted. In the example of FIG. 1, the accessory receiver (400) is mounted below the winch (104), and the support frame (110) is configured to fit inside and be secured to the accessory receiver (400). The support frame (110) of FIG. 1 may be secured to the accessory receiver (400) by bolt or other rod passing through the accessory receiver (400) and the support frame (110) which may then be secured using a nut or some other clip or fastener. Of course there are many other ways in which the support frame (110) of FIG. 1 may be secured inside the accessory receiver (400) as will occur to those of skill in the art.

In FIG. 1, the UTV accessory (110) includes two auxiliary support bars (150). The auxiliary support bars (150) are metal tubes or rods that provide additional support to the support frame (110) and secure the support frame (110) to the UTV (102). Each of the one or more auxiliary support bars (150) in FIG. 1 mounts to the support frame (110) and mounted to the front of the UTV (102) to provide additional structural support for the support frame (110). The auxiliary support bars (150) of FIG. 1 mount to the support frame (110) and the front of the UTV (102) using bolts and nuts. In particular, the auxiliary support bars (150) of FIG. 1 mount almost midway up the vertical portion of the support frame (110) and mount to the front grill of the UTV (102).

In FIG. 1, the UTV accessory (100) includes a first pulley (120) mounted to a bottom region of the support frame (110) on the front side substantially level with the winch (104) mounted on the UTV (102). The first pulley (120) of FIG. 1 is a wheel with a grooved rim around which a winch line passes. In the example of FIG. 1, this groove is shaped like a V or U so that the winch line does not easily come off of the pulley (120). To ease the ability of the winch line to pass through the first pulley (120) of FIG. 1, the first pulley (120) includes bearings that allows the pulley wheel to rotate around its axis. These bearings could be in the form of ball bearings, pin bearings, or any other bearings as will occur to those of skill in the art. The first pulley (120) of FIG. 1 is capable of receiving a winch line (122) from the winch (104) and redirecting the winch line (122). In this way, the first pulley (120) of FIG. 1 acts to change the direction of a force applied to the winch line (122). The goal of redirecting the direction of force is to pull and object in a particular direction.

The UTV accessory (100) of FIG. 1 also includes a second pulley (130) mounted toward a top region of the support frame (110), also on the front side of the support frame (110). The second pulley (130) capable of receiving the winch line (122) from the first pulley (120) and redirecting the winch line (122) so that the direction of a winch force provided by the winch (104) is relocated to a higher region than the location of the winch (104) on the UTV (102). In this way, objects attached to the hook (172) may be hoisted up into the air even though the winch (104) is positioned much lower to the ground. In this way the exemplary UTV accessory (100) of FIG. 1 allows a single person operating the winch (104) to hoist a heavy object into the air that would typically require the assistance of multiple persons.

In the example of FIG. 1, the UTV accessory (100) also includes a hook catch (170) mounted to the support frame (110) just above where the auxiliary support bars (150) are mounted. The hook catch (170) of FIG. 1 is capable of securing a winch hook (172) to hold the winch hook (172) in place when not being used. The winch hook (172) of FIG. 1 can be connected to the hook catch (170), and then the winch (104) may be operated to pull in excess winch cable (122) thereby removing any slack in the winch cable (122).

Figure 2:
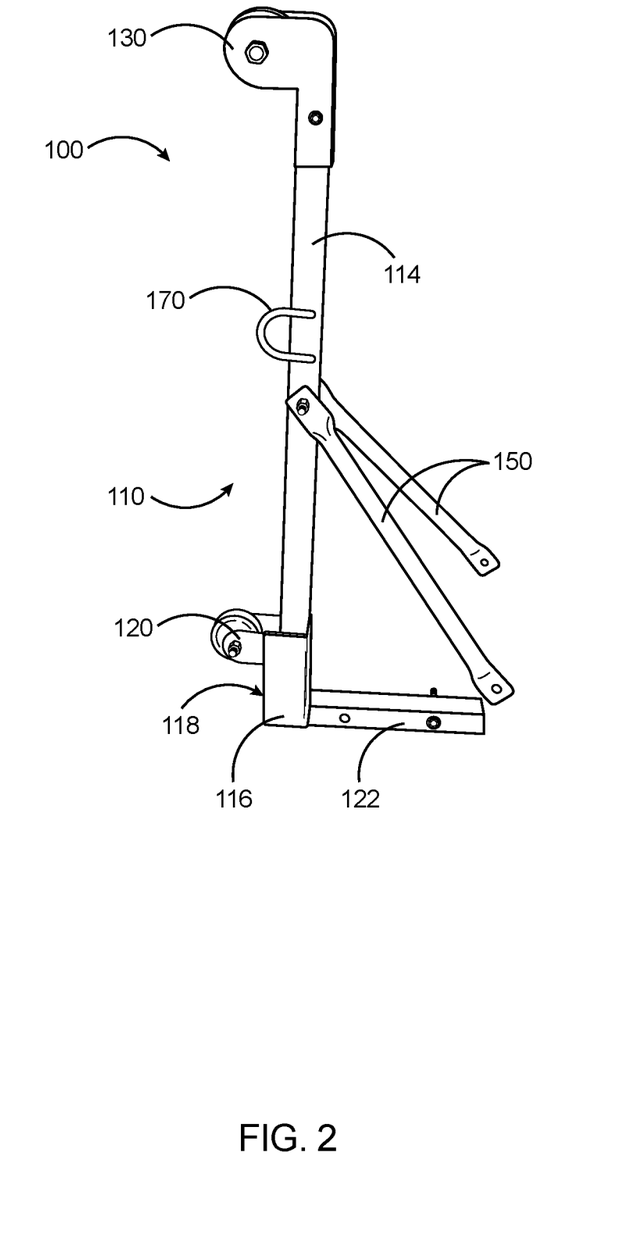
FIG. 2 sets forth a line drawing illustrating a perspective view of an exemplary UTV accessory for a side-by-side UTV having a front-mounted winch according to embodiments of the present invention.

FIG. 1 depicts a UTV accessory (100) installed on a side-by-side UTV (102) according to embodiments of the present invention. Turning now to FIG. 2, FIG. 2 sets forth a line drawing illustrating another perspective view of the exemplary UTV accessory (100) for the UTV (102) having a front-mounted winch according to embodiments of the present invention.

The UTV accessory (100) of FIG. 2 is the same UTV accessory of FIG. 1 but shown by itself uninstalled on the UTV (102). That is, the UTV accessory (100) of FIG. 2 includes a support frame (110) capable of mounting to a front region of the UTV (102). The UTV accessory (100) of FIG. 2 includes a first pulley (120) mounted to a bottom region of the support frame (110) substantially level with the winch (104) mounted on the UTV (102). The first pulley (120) of FIG. 2 is capable of receiving a winch line (as shown in FIG. 1) from the winch (as shown in FIG. 1) and redirecting the winch line (as shown in FIG. 1) toward the second pulley (130). The UTV accessory (100) of FIG. 2 also includes a second pulley (130) mounted toward a top region of the support frame (110). The second pulley (130) of FIG. 2 is capable of receiving the winch line (as shown in FIG. 1) from the first pulley (120) and redirecting the winch line (as shown in FIG. 1) so that the direction of a winch force provided by the winch (as shown in FIG. 1) is relocated to a higher region than the location of the winch (as shown in FIG. 1) on the UTV (as shown in FIG. 1).

The UTV accessory (100) of FIG. 2 also includes two auxiliary support bars (150). Each auxiliary support bars (150) of FIG. 2 is mounted to the support frame (110) and mounted to the front of the UTV (102) to provide additional structural support for the support frame (110). The UTV accessory (100) of FIG. 2 also includes a hook catch (170) mounted to the support frame (110). The hook catch (170) of FIG. 2 is capable of securing a winch hook (172) to hold the winch hook (172) in place when not being used.

In FIG. 2, the support frame (110) of the UTV accessory (100) includes a horizontal support bar (112), a vertical support bar (114), and support plates (116). Taken together, the component form an L-shaped support frame (110). The support plates (116) of FIG. 2 connect the horizontal support bar (112) with the vertical support bar (114) at a right angle and form a gap (118) between the horizontal support bar (112) and the vertical support bar (114) through which the winch line (as shown in FIG. 1) is capable of passing before being routed around the first pulley (120) toward the second pulley (130).

Figure 3:
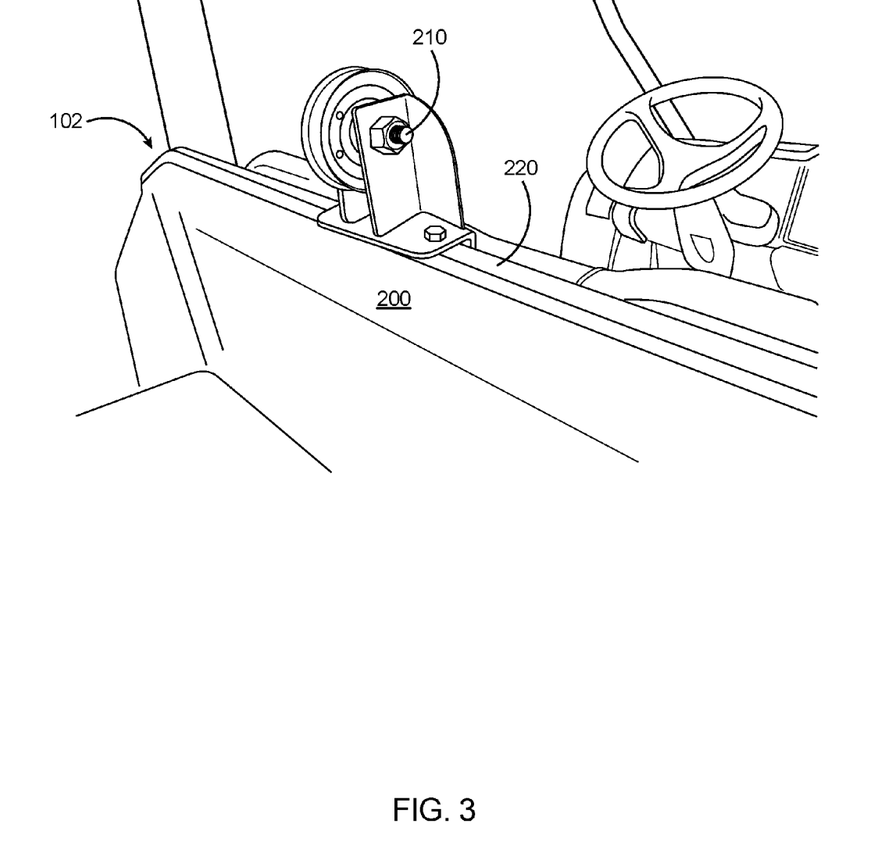
FIG. 3 sets forth a line drawing illustrating a perspective view of an exemplary third pulley useful with an exemplary UTV accessory for a side-by-side UTV having a front-mounted winch according to embodiments of the present invention.
Figure 4:
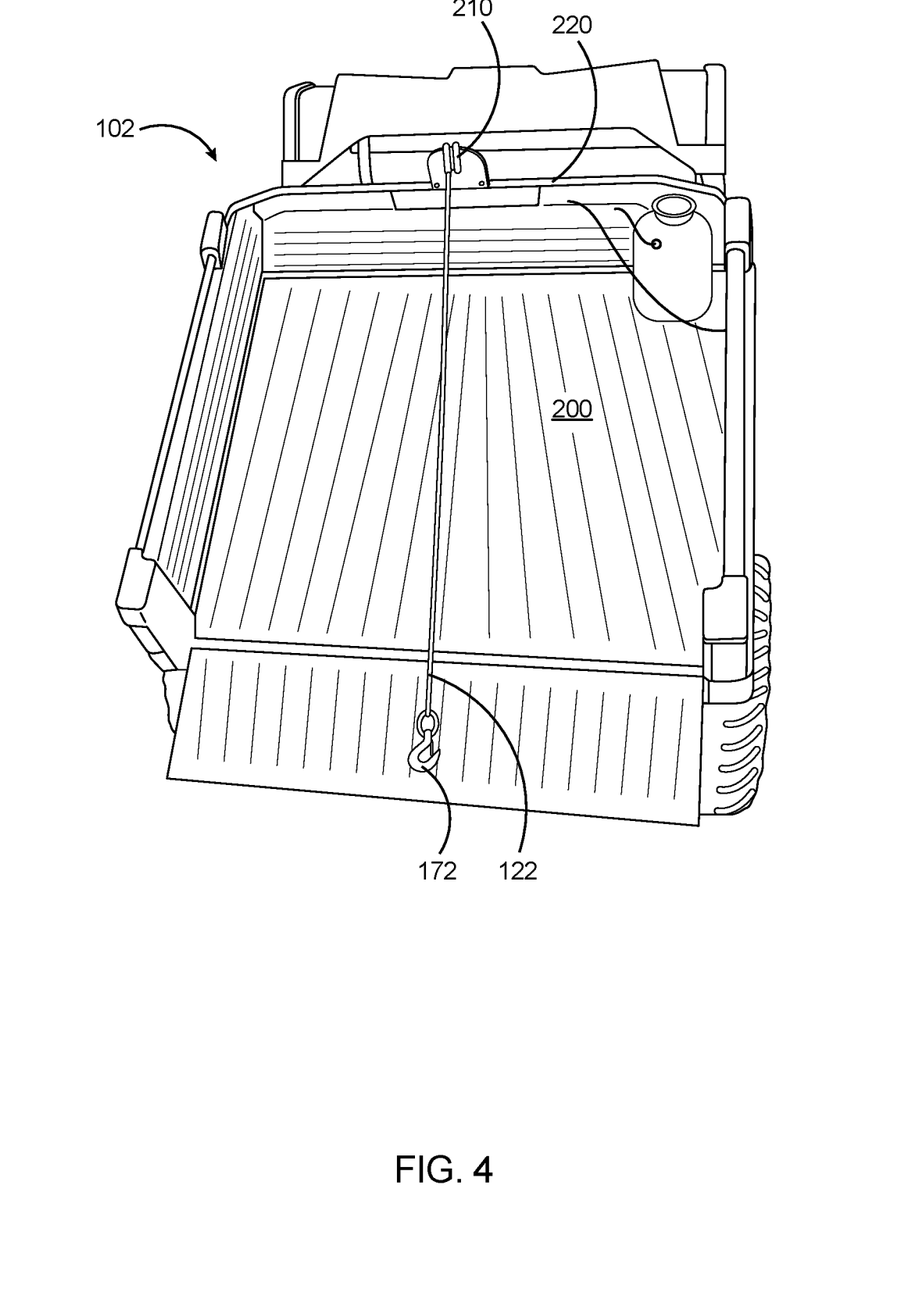
FIG. 4 sets forth a line drawing illustrating a perspective view of an exemplary third pulley and exemplary dump bed useful with an exemplary UTV accessory for a side-by-side UTV having a front-mounted winch according to embodiments of the present invention.
Figure 5:
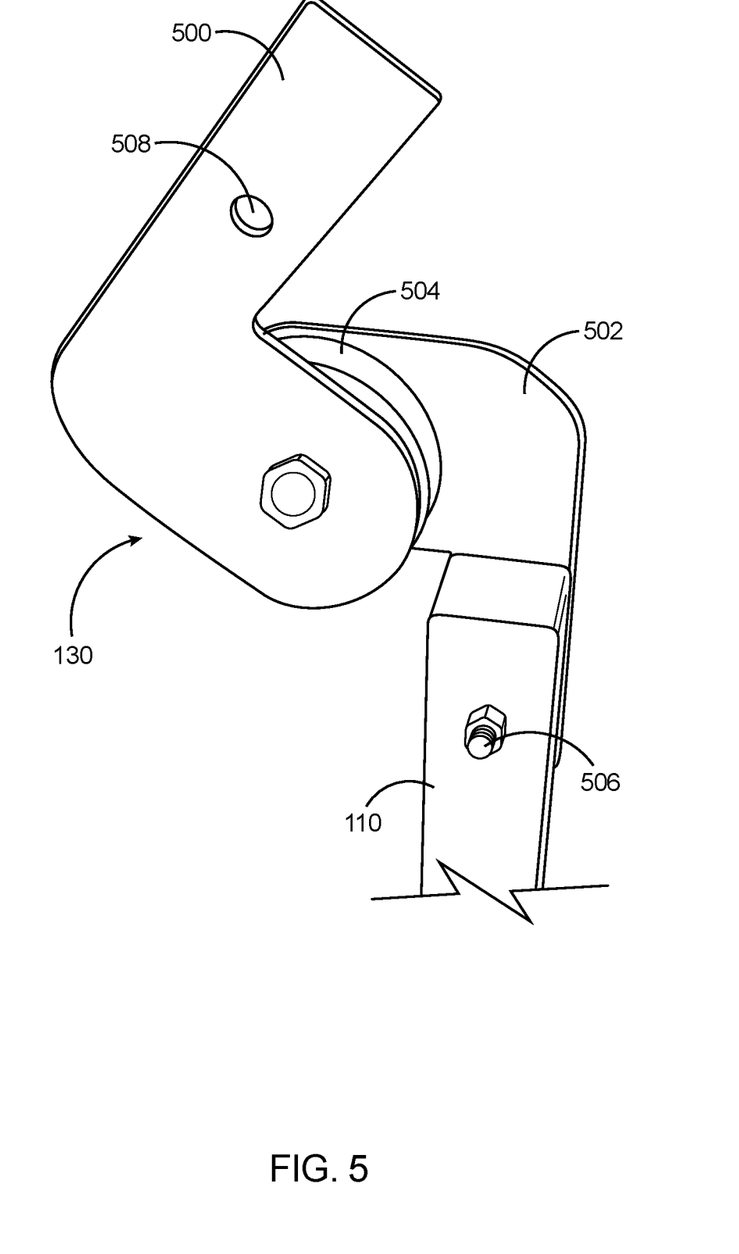
FIG. 5 sets forth a line drawing illustrating a perspective view of an exemplary second pulley useful with an exemplary UTV accessory for a side-by-side UTV having a front-mounted winch according to embodiments of the present invention.

In the example of FIG. 1, the UTV accessory (100) is mounted to the UTV (102) for use in lifting objects in front of the UTV (102) or relocating the direction of force from the winch substantially higher than the location of the winch. FIGS. 3, 4, and 5 show that through the use of an additional pulley, re-routing the winch line through the second pulley (shown in FIGS. 1 and 2), the exemplary UTV accessory (100) may also be used to lift objects into the back bed of a UTV and relocate the direction of force provided by the winch to the region above and aft of the UTV's winch. Turning now to FIG. 3, FIG. 3 sets forth a line drawing illustrating a perspective view of an exemplary third pulley useful with an exemplary UTV accessory for a side-by-side UTV having a front-mounted winch according to embodiments of the present invention.

The UTV accessory (not shown in FIG. 3) of FIG. 3 is mounted as show in FIG. 1. The UTV (102) of FIG. 3 has a dump bed (200). The dump bed (200) of FIG. 3 is a bed in the back of the UTV (102) that is hinged toward the back end and lifts up at the front end, thereby tilting backward to dump loose material or unsecured objects out of the UTV bed (200).

In the example of FIG. 3, the UTV accessory (100) includes a third pulley (210) mounted at the center of the front edge (220) of the dump bed (200). The third pulley (210) of FIG. 3 is capable of receiving the winch line (shown in FIG. 1) from the second pulley (130) and redirecting the winch line (shown in FIG. 1) so that the direction of the winch line force provided by the winch (shown in FIG. 1) is relocated to a rear region aft of the winch (shown in FIG. 1). Because the third pulley (210) is mounted to the center of the front edge (220) of the dump bed (200), the winch line (shown in FIG. 1) is capable of passing between two passengers sitting side by side in the UTV (102).

Turning now to FIG. 4 for a different view, FIG. 4 sets forth a line drawing illustrating a perspective view of an exemplary third pulley (210) and exemplary dump bed (200) useful with an exemplary UTV accessory (shown in FIG. 1) for a side-by-side UTV (102) having a front-mounted winch (shown in FIG. 1) according to embodiments of the present invention. The UTV (102) of FIG. 4 is the same as the UTV (102) of FIG. 3 and includes a dump bed (200) having a third pulley (210) mounted at the center of the front edge (220) of the dump bed (200). The third pulley (210) of FIG. 4 receives the winch line (122) from the second pulley (shown in FIG. 1) and redirecting the winch line (122) so that the direction of the winch line force provided by the winch (shown in FIG. 1) is relocated to a rear region aft of the winch (shown in FIG. 1).

When transitioning the exemplary UTV accessory (100) from being used to lift objects in the front of the UTV (102) as in FIG. 1 to being used to lift objects into the dump bed (200) of the UTV (102) as in FIG. 4, the direction that the winch line (122 in FIGS. 1 and 4) is wound around the second pulley (130 in FIG. 1) must be reversed. The exemplary second pulley (130) of FIG. 1 is designed to allow an operator to easily reverse the direction of the winch line (122). FIG. 5 sets forth a line drawing illustrating a perspective view of an exemplary second pulley useful with an exemplary UTV accessory for a side-by-side UTV having a front-mounted winch according to embodiments of the present invention.

The second pulley (130) of FIG. 5 includes a fixed plate (502), a moveable plate (500), and a pulley wheel (504) mounted between the fixed plate (502) and the moveable plate (500) using a bolt and nut combination. The fixed plate (502) of FIG. 5 is welded to the support frame (110). The moveable plate (500) of FIG. 5 is substantially the same shape as the fixed plate (502) and rotates around the bolt passing through the pulley wheel (504).

The moveable plate (500) of FIG. 5 is secured by a plate fastener. The plate fastener of FIG. 5 secures the moveable plate (500) in place in place as shown in FIG. 1. The plate fastener may be implemented in a variety of ways as will occur to those of skill in the art, but in FIG. 5 the plate fastener is implemented as bolt (506) passing through hole (508) and secured with a nut.

When an operator desires to reverse direction of the winch line on the second pulley (130), the operator removes the bolt (506) passing through hole (508) and rotates the moveable plate (500) upward. The operator may then remove the wench line, reverse the direction, and re-run the winch line around the second pulley (130) in the opposite direction. The moveable plate (500) may then be rotated downward to align the hole (508) with the location of the bolt (506). The operator can then secure the moveable plate (500) in place by passing the bolt (506) through the hole (508) and securing it with a nut.

To provide another view of the UTV accessory (100) and third pulley (210) described in FIGS. 3, 4, and 5, FIG. 6 sets forth a line drawing illustrating a right view of an exemplary UTV accessory (100) for a side-by-side UTV (102) having a front-mounted winch (104) and a dump bed (200) according to embodiments of the present invention. The UTV accessory (100) of FIG. 6 includes a support frame (110) capable of mounting to a front region of the UTV (102) and two auxiliary support bars (150). Each of the one or more auxiliary support bars (150) is mounted to the support frame (110) and is mounted to the front of the UTV (102) to provide additional structural support for the support frame (110).

Figure 6:
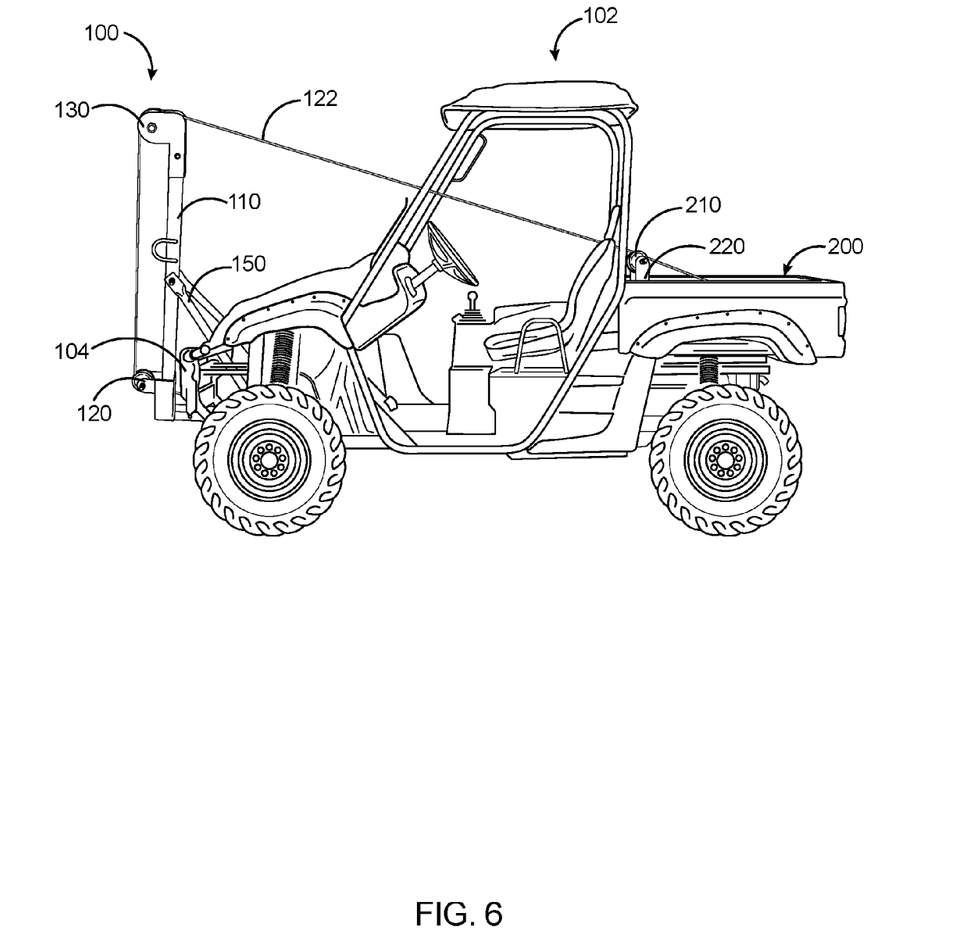
FIG. 6 sets forth a line drawing illustrating a right view of an exemplary UTV accessory for a side-by-side UTV having a front-mounted winch according to embodiments of the present invention.

The UTV accessory (100) of FIG. 6 includes a first pulley (120) mounted to a bottom region of the support frame (110) substantially level with the winch (104) mounted on the UTV (102). The first pulley (120) of FIG. 6 is capable of receiving a winch line (122) from the winch (104) and redirecting the winch line (122) toward the second pulley (130).

The UTV accessory (100) of FIG. 6 includes a second pulley (130) mounted toward a top region of the support frame (110). The second pulley (130) is capable of receiving the winch line (122) from the first pulley (120) and redirecting the winch line (122) so that the direction of a winch force provided by the winch (104) is relocated to a higher region than the location of the winch (104) on the UTV (102).

The UTV accessory (100) of FIG. 6 includes a third pulley (210) mounted to a front edge (220) of the dump bed (200). The third pulley (210) of FIG. 6 is capable of receiving the winch line (122) from the second pulley (130) and redirecting the winch line (122) so that the direction of the winch line force provided by the winch (104) is relocated to a rear region aft of the winch (104).

In some embodiments of the present invention, having the direction of force provided by a UTV winch higher than the front edge of the UTV's dump bed may be desirable. In certain embodiments, locating the direction of force near the top of the passenger cabin may be desirable. Accordingly, FIG. 7 sets forth a line drawing illustrating a right view of an exemplary UTV accessory (100) using a lower cabin pulley (400) for a side-by-side UTV (102) having a front-mounted winch (104), a dump bed (200), and a cabin (202) according to embodiments of the present invention.

Figure 7:
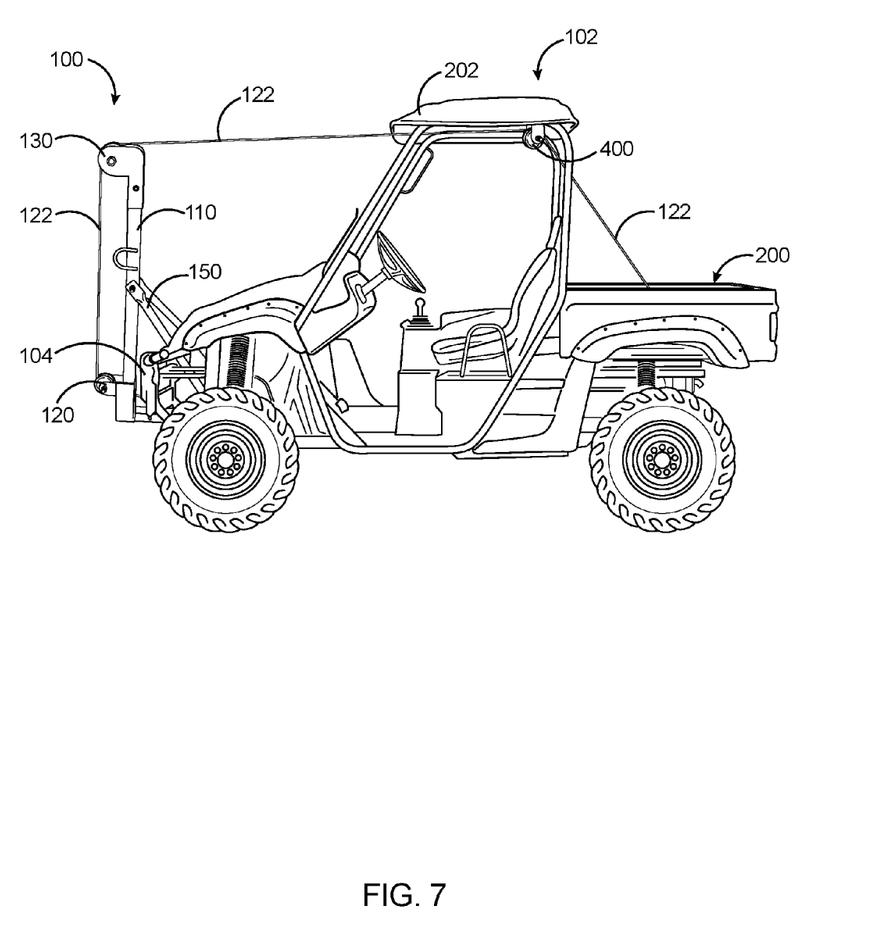
FIG. 7 sets forth a line drawing illustrating a right view of an exemplary UTV accessory using a lower cabin pulley for a side-by-side UTV having a front-mounted winch according to embodiments of the present invention.

The UTV accessory (100) of FIG. 7 includes a support frame (110) capable of mounting to a front region of the UTV (102) and two auxiliary support bars (150). Each of the one or more auxiliary support bars (150) is mounted to the support frame (110) and is mounted to the front of the UTV (102) to provide additional structural support for the support frame (110).

The UTV accessory (100) of FIG. 7 includes a first pulley (120) mounted to a bottom region of the support frame (110) substantially level with the winch (104) mounted on the UTV (102). The first pulley (120) of FIG. 7 is capable of receiving a winch line (122) from the winch (104) and redirecting the winch line (122) toward the second pulley (130).

The UTV accessory (100) of FIG. 7 includes a second pulley (130) mounted toward a top region of the support frame (110). The second pulley (130) is capable of receiving the winch line (122) from the first pulley (120) and redirecting the winch line (122) so that the direction of a winch force provided by the winch (104) is relocated to a higher region than the location of the winch (104) on the UTV (102).

In FIG. 7, the UTV accessory (100) includes a lower cabin pulley (400) mounted underside a top of the cabin (202) of the UTV (102). The lower cabin pulley (400) of FIG. 7 is capable of receiving the winch line (122) from the second pulley (130) and redirecting the winch line (122) so that the direction of the winch line force provided by the winch (104) is relocated to a top-rear region aft of the winch (104) just below (adjacent to) the ceiling of the cabin (202).

In still other embodiments of the present invention, locating the direction of force even higher than the passenger cabin may be desirable to provide additional vertical force using the same winch. That is, the more directly overhead that the winch force is over an object, the more of the winch force that is available to lift the object. Accordingly, FIG. 8 sets forth a line drawing illustrating a right view of an exemplary UTV accessory (100) using a upper cabin pulley (500) for a side-by-side UTV (102) having a front-mounted winch (104), a dump bed (200), and a cabin (202) according to embodiments of the present invention.

Figure 8:
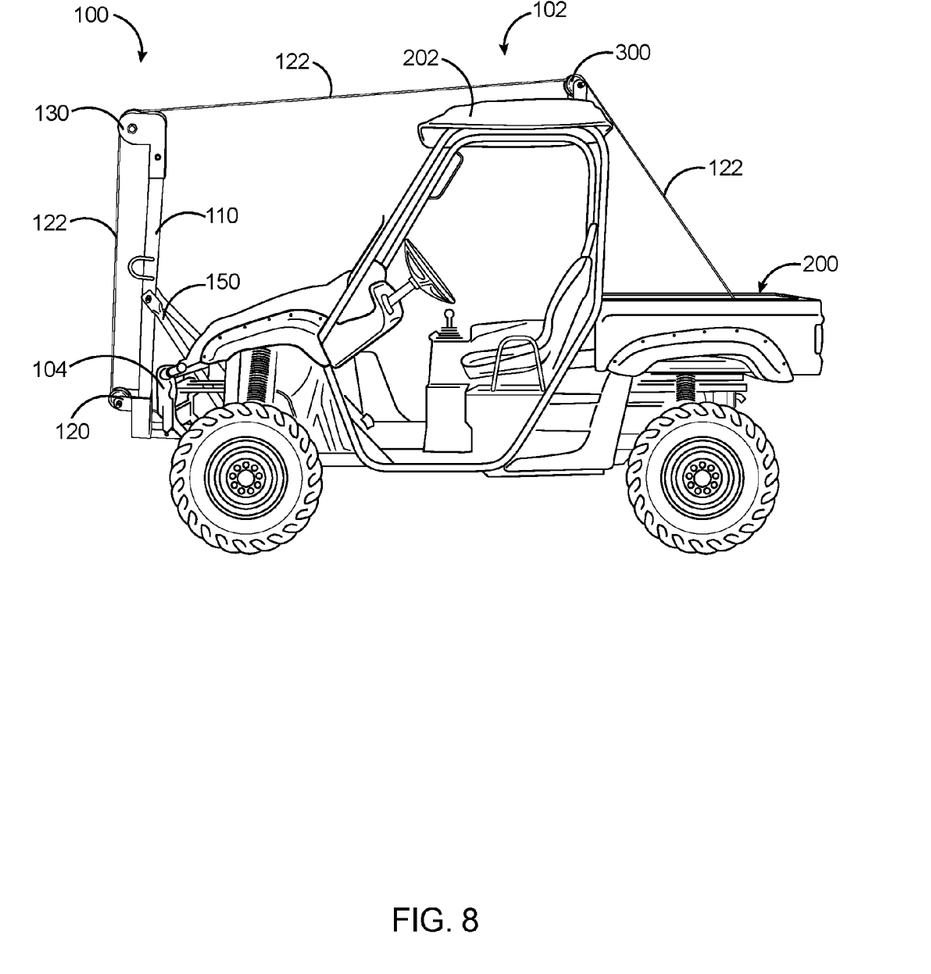
FIG. 8 sets forth a line drawing illustrating a right view of an exemplary UTV accessory using an upper cabin pulley for a side-by-side UTV having a front-mounted winch according to embodiments of the present invention.

The UTV accessory (100) of FIG. 8 includes a support frame (110) capable of mounting to a front region of the UTV (102) and two auxiliary support bars (150). Each of the one or more auxiliary support bars (150) is mounted to the support frame (110) and is mounted to the front of the UTV (102) to provide additional structural support for the support frame (110).

The UTV accessory (100) of FIG. 8 includes a first pulley (120) mounted to a bottom region of the support frame (110) substantially level with the winch (104) mounted on the UTV (102). The first pulley (120) of FIG. 8 is capable of receiving a winch line (122) from the winch (104) and redirecting the winch line (122) toward the second pulley (130).

The UTV accessory (100) of FIG. 8 includes a second pulley (130) mounted toward a top region of the support frame (110). The second pulley (130) is capable of receiving the winch line (122) from the first pulley (120) and redirecting the winch line (122) so that the direction of a winch force provided by the winch (104) is relocated to a higher region than the location of the winch (104) on the UTV (102).

In FIG. 8, the UTV accessory (100) also includes an upper cabin pulley (300) mounted on top of the cabin (202) of the UTV (102). The upper cabin pulley (300) of FIG. 8 is capable of receiving the winch line (122) from the second pulley (130) and redirecting the winch line (122) so that the direction of the winch line force provided by the winch (104) is relocated to a top-rear region aft of the winch (104) and on top of the cabin (202).

Those of skill in the art will appreciate the benefits of the UTV accessory for a side-by-side UTV having a front-mounted winch according to embodiments of the present invention. For example only, and not for limitation, the exemplary UTV accessory according to embodiments of the present invention may be useful for winching a wild hog straight up into the air after tying the winch line around the hogs neck, pulling up T-posts, lifting logs to carry them to a log splitter, loading a metal tower stand on to a trailer, moving trees that fall over on a trail, pulling bushes from flower beds, pulling brush out of a lake, allowing a single operator to pull a large deer or hog into the bed of the UTV, moving heavy items around a farm, pulling water pipe out of a shallow well, hoisting up a trailer to change a flat tire, as well as many other uses as will occur to those of skill in the art.

While certain exemplary embodiments have been described in details and shown in the accompanying drawings, it is to be understood that such embodiments are merely illustrative of and not devised without departing from the basic scope thereof, which is determined by the claims that follow.

I claim:

1. A utility task vehicle ("UTV") accessory for a side-by-side UTV having a front-mounted winch, the UTV Accessory comprising:

a support frame capable of mounting to a front region of the UTV;

a first pulley mounted to a bottom region of the support frame substantially level with the winch mounted on the UTV, the first pulley capable of receiving a winch line from the winch and redirecting the winch line;

a second pulley mounted toward a top region of the support frame, the second pulley capable of receiving the winch line from the first pulley and redirecting the winch line so that the direction of a winch force provided by the winch is relocated to a higher region than the location of the winch on the UTV; and wherein the support frame further comprises a horizontal support bar, a vertical support bar, and support plates, the support plates connecting the horizontal support bar with the vertical support bar at a right angle and forming a gap between the horizontal support bar and the vertical support bar through which the winch line is capable of passing.

2. The UTV accessory of claim 1 wherein the UTV further comprises a dump bed and wherein the UTV accessory further comprises a third pulley mounted to a front edge of the dump bed, the third pulley capable of receiving the winch line from the second pulley and redirecting the winch line so that the direction of the winch line force provided by the winch is relocated to a rear region aft of the winch.

3. The UTV accessory of claim 2 wherein the third pulley is mounted to a center of the front edge of the dump bed of the UTV so that the winch line is capable of passing between two passengers sitting side by side in the UTV.

4. The UTV accessory of claim 1 wherein the support frame is L-shaped.

5. The UTV accessory of claim 1 further comprising one or more auxiliary support bars, each of the one or more auxiliary support bars mounted to the support frame and mounted to a front of the UTV to provide additional structural support for the support frame.

6. The UTV accessory of claim 1 wherein the UTV further comprises a cabin and a dump bed and wherein the UTV accessory further comprises an upper cabin pulley mounted on top of the cabin of the UTV, the upper cabin pulley capable of receiving the winch line from the second pulley and redirecting the winch line so that the direction of the winch line force provided by the winch is relocated to a top-rear region aft of the winch and on top of the cabin.

7. The UTV accessory of claim 1 wherein the UTV further comprises a cabin and a dump bed and wherein the UTV accessory further comprises a lower cabin pulley mounted underside a top of the cabin of the UTV, the lower cabin pulley capable of receiving the winch line from the second pulley and redirecting the winch line so that the direction of the winch line force provided by the winch is relocated to a top-rear region aft of the winch and adjacent to and below a ceiling of the cabin.

8. The UTV accessory of claim 1 wherein the first pulley and the second pulley are mounted to front side of the support frame.

9. The UTV accessory of claim 1 further comprising a hook catch mounted to the support frame, the hook catch capable of securing a winch hook to hold the winch hook in place when not being used.

10. The UTV accessory of claim 1 where the UTV further comprises an accessory receiver mounted below the winch and wherein the support frame is configured to fit inside and be secured to the accessory receiver.

11. The UTV accessory of claim 1 wherein the second pulley further comprises a fixed plate, a moveable plate, and a wheel mounted between the fixed plate and the moveable plate, wherein the moveable plate is secured by a plate fastener.

* * * * *